US010067800B2

(12) United States Patent
Antony et al.

(10) Patent No.: US 10,067,800 B2
(45) Date of Patent: Sep. 4, 2018

(54) PERIPHERAL DEVICE SHARING ACROSS VIRTUAL MACHINES RUNNING ON DIFFERENT HOST COMPUTING SYSTEMS

(71) Applicant: VMWARE, INC., Palo Alto, CA (US)

(72) Inventors: Jinto Antony, Bangalore (IN); Sudhish Panamthanath Thankappan, Bangalore (IN); Madhusudhanan Gangadharan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 115 days.

(21) Appl. No.: 14/602,297

(22) Filed: Jan. 22, 2015

(65) Prior Publication Data

US 2016/0132358 A1    May 12, 2016

(30) Foreign Application Priority Data

Nov. 6, 2014   (IN) .......................... 5585/CHE/2014

(51) Int. Cl.
| | |
|---|---|
| *G06F 9/50* | (2006.01) |
| *G06F 13/10* | (2006.01) |
| *G06F 13/12* | (2006.01) |
| *G06F 9/455* | (2018.01) |
| *H04L 29/06* | (2006.01) |

(52) U.S. Cl.
CPC ........ *G06F 9/5044* (2013.01); *G06F 9/45558* (2013.01); *G06F 13/107* (2013.01); *G06F 13/128* (2013.01); *G06F 2009/4557* (2013.01); *G06F 2009/45579* (2013.01); *G06F 2009/45587* (2013.01); *H04L 63/0853* (2013.01); *H04L 63/0876* (2013.01)

(58) Field of Classification Search
CPC ............... G06F 9/5044; G06F 9/45558; H04L 63/0876; H04L 63/0853; H04L 63/08; H04L 63/0815; H04L 63/10
USPC .......................................................... 726/4
See application file for complete search history.

(56) References Cited

U.S. PATENT DOCUMENTS

| | | | | |
|---|---|---|---|---|
| 5,485,455 A | * | 1/1996 | Dobbins | ............ H04L 12/5602 370/255 |
| 5,784,569 A | * | 7/1998 | Miller | ................. G06F 13/3625 348/E7.073 |
| 6,067,557 A | * | 5/2000 | Hegde | ................... G06F 9/4881 718/102 |
| 6,452,935 B1 | * | 9/2002 | Gibbs | ................. H04L 12/2805 370/437 |
| 6,728,770 B1 | * | 4/2004 | Bradford | ............ H04L 12/2602 709/226 |

(Continued)

*Primary Examiner* — Izunna Okeke
*Assistant Examiner* — Shahriar Zarrineh
(74) *Attorney, Agent, or Firm* — Thomas Horstemeyer, LLP

(57) ABSTRACT

Techniques for sharing a peripheral device connected to a first host computing system in a cluster are disclosed. In one embodiment, a request to access the peripheral device connected to the first host computing system is received from a virtual machine running on a second host computing system. Further, a bandwidth requirement associated with the peripheral device is determined. Furthermore, one of enabling the virtual machine to remotely access the peripheral device over a network and recommending migration of the virtual machine to the first host computing system to locally access the peripheral device is performed based on the bandwidth requirement of the peripheral device.

20 Claims, 6 Drawing Sheets

(56) References Cited

U.S. PATENT DOCUMENTS

| | | | | |
|---|---|---|---|---|
| 7,036,122 B2* | 4/2006 | Bennett | G06F 9/5077 | 711/202 |
| 7,447,854 B1* | 11/2008 | Cannon | G06F 11/1451 | 711/162 |
| 7,484,208 B1* | 1/2009 | Nelson | G06F 9/45558 | 711/6 |
| 8,032,253 B2 | 10/2011 | Nagata | B25J 19/06 | 180/2.1 |
| 8,032,353 B1* | 10/2011 | Baron | G06F 9/45558 | 703/24 |
| 8,224,885 B1* | 7/2012 | Doucette | G06F 9/5044 | 709/201 |
| 8,464,255 B2* | 6/2013 | Nathuji | G06F 9/5077 | 718/1 |
| 8,612,330 B1* | 12/2013 | Certain | G06Q 30/06 | 705/37 |
| 8,656,386 B1* | 2/2014 | Baimetov | G06F 9/45558 | 709/219 |
| 8,738,972 B1* | 5/2014 | Bakman | G06F 11/0712 | 714/47.1 |
| 8,775,497 B2* | 7/2014 | Okamori | G06F 9/5044 | 709/201 |
| 8,825,964 B1* | 9/2014 | Sopka | G06F 3/0671 | 711/152 |
| 8,935,695 B1* | 1/2015 | Rajaa | G06F 9/45558 | 718/1 |
| 9,092,250 B1* | 7/2015 | Hyser | G06F 9/5088 | |
| 9,529,619 B2* | 12/2016 | Wang | G06F 9/45558 | |
| 2001/0043700 A1* | 11/2001 | Shima | H04L 29/06 | 379/399.01 |
| 2006/0092944 A1* | 5/2006 | Wingard | H04L 49/109 | 370/395.2 |
| 2006/0107269 A1* | 5/2006 | Bantz | G06F 9/5077 | 719/310 |
| 2006/0176827 A1* | 8/2006 | Lehew | H04L 43/00 | 370/252 |
| 2007/0028010 A1* | 2/2007 | Krasnansky | G06F 1/28 | 710/18 |
| 2007/0078988 A1* | 4/2007 | Miloushev | G06F 9/485 | 709/227 |
| 2008/0201455 A1* | 8/2008 | Husain | G06F 9/445 | 709/220 |
| 2008/0301340 A1* | 12/2008 | Stotz | G06F 9/5077 | 710/68 |
| 2009/0031303 A1* | 1/2009 | Frank | G06F 12/1475 | 718/1 |
| 2009/0094673 A1* | 4/2009 | Seguin | G06F 21/51 | 726/1 |
| 2009/0198766 A1* | 8/2009 | Chen | G06F 9/45558 | 709/202 |
| 2009/0222558 A1* | 9/2009 | Xu | G06F 9/485 | 709/224 |
| 2009/0276771 A1* | 11/2009 | Nickolov | G06F 9/4856 | 717/177 |
| 2010/0027420 A1* | 2/2010 | Smith | G06F 9/4856 | 370/235 |
| 2010/0191854 A1* | 7/2010 | Isci | G06F 1/3203 | 709/226 |
| 2010/0287548 A1* | 11/2010 | Zhou | G06F 9/4856 | 718/1 |
| 2010/0318608 A1* | 12/2010 | Huang | G06F 9/4856 | 709/205 |
| 2011/0019531 A1* | 1/2011 | Kim | G06F 11/203 | 370/216 |
| 2011/0138384 A1* | 6/2011 | Bozek | H04L 41/0806 | 718/1 |
| 2011/0153697 A1* | 6/2011 | Nickolov | G06F 9/4856 | 707/827 |
| 2011/0153798 A1* | 6/2011 | Groenendaal | H04L 63/20 | 709/223 |
| 2011/0276963 A1* | 11/2011 | Wu | H04L 67/1097 | 718/1 |
| 2011/0283278 A1* | 11/2011 | Murrell | G06F 9/5077 | 718/1 |
| 2012/0016970 A1* | 1/2012 | Shah | G06F 9/45558 | 709/220 |
| 2012/0017031 A1* | 1/2012 | Mashtizadeh | G06F 9/45558 | 711/6 |
| 2012/0054367 A1* | 3/2012 | Ramakrishnan | G06F 9/4856 | 709/242 |
| 2012/0102190 A1* | 4/2012 | Durham | H04L 41/0823 | 709/224 |
| 2012/0122573 A1* | 5/2012 | Ha | H04L 67/1095 | 463/31 |
| 2012/0180042 A1* | 7/2012 | Tsirkin | G06F 9/45558 | 718/1 |
| 2012/0226800 A1* | 9/2012 | Baratakke | H04L 49/70 | 709/224 |
| 2012/0226866 A1* | 9/2012 | Bozek | G06F 9/45558 | 711/122 |
| 2012/0240110 A1* | 9/2012 | Breitgand | G06F 9/45558 | 718/1 |
| 2012/0265860 A1* | 10/2012 | Bockus | H04L 12/40039 | 709/220 |
| 2013/0007254 A1* | 1/2013 | Fries | H04L 43/0876 | 709/224 |
| 2013/0083690 A1* | 4/2013 | Cardona | H04L 69/12 | 370/254 |
| 2013/0173849 A1* | 7/2013 | Balakrishnan | G06F 3/0613 | 711/103 |
| 2013/0205106 A1* | 8/2013 | Tati | G06F 3/061 | 711/159 |
| 2013/0268672 A1* | 10/2013 | Justafort | H04L 67/10 | 709/226 |
| 2013/0297753 A1* | 11/2013 | Lu | G06F 9/45558 | 709/220 |
| 2013/0318228 A1* | 11/2013 | Raja | G06F 3/0635 | 709/224 |
| 2013/0326515 A1* | 12/2013 | Hara | G06F 9/455 | 718/1 |
| 2014/0007091 A1* | 1/2014 | Arges | G06F 9/5011 | 718/1 |
| 2014/0019974 A1* | 1/2014 | Siu | G06F 9/4856 | 718/1 |
| 2014/0025890 A1* | 1/2014 | Bert | G06F 12/0842 | 711/118 |
| 2014/0068317 A1* | 3/2014 | Kanigicherla | G06F 9/5011 | 714/2 |
| 2014/0082616 A1* | 3/2014 | Kurita | G06F 9/455 | 718/1 |
| 2014/0123133 A1* | 5/2014 | Luxenberg | G06F 9/45558 | 718/1 |
| 2014/0149490 A1* | 5/2014 | Luxenberg | G06F 15/00 | 709/203 |
| 2014/0165063 A1* | 6/2014 | Shiva | G06F 21/57 | 718/1 |
| 2014/0181806 A1* | 6/2014 | Abiezzi | G06F 9/45558 | 718/1 |
| 2014/0195590 A1* | 7/2014 | Luxenberg | H04L 67/025 | 709/203 |
| 2014/0244866 A1* | 8/2014 | Manula | G06F 13/28 | 710/27 |
| 2014/0298338 A1* | 10/2014 | Doi | G06F 9/4856 | 718/1 |
| 2014/0344440 A1* | 11/2014 | Dutta | H04L 41/0823 | 709/224 |
| 2015/0055474 A1* | 2/2015 | Eyada | H04L 67/1004 | 370/235 |
| 2015/0169352 A1* | 6/2015 | Shi | H04L 67/10 | 718/1 |
| 2015/0304279 A1* | 10/2015 | Bui | H04L 67/08 | 726/4 |
| 2015/0309828 A1* | 10/2015 | Shaik | G06F 9/5027 | 718/1 |
| 2015/0339147 A1* | 11/2015 | Ponsford | H04L 67/10 | 718/1 |

(56) References Cited

U.S. PATENT DOCUMENTS

2016/0057014 A1* 2/2016 Thakkar ............. G06F 9/45558
709/223
2016/0294628 A1* 10/2016 Riddle ................ H04L 41/0893
2017/0054652 A1* 2/2017 Baker ................ H04L 41/0809

* cited by examiner

| DEVICE ID 502 | DEVICE NAME 504 | HOST ATTACHED TO 506 | TYPE 508 | DEVICE BANDWIDTH 510 | CURRENTLY USED (YES/NO) 512 | REMOTE ACCESS (YES/NO) 514 | HOST N/W SPEED 516 | BANDWIDTH ALLOCATED to VM 518 | ESTIMATED ACCESS DURATION 520 | AUTHENTICATION REQUIRED 522 |
|---|---|---|---|---|---|---|---|---|---|---|
| 1 | LTO | H1 | IDE | 2 GBPS | NO | YES | 1GBPS | 600 MBPS | 2 HR | YES |
| 2 | SSD | H2 | USB | 3 GBPS | YES | NO | 1GBPS | 1 GBPS | 30 MIN | NO |
| 3 | BARCODE READER | H8 | SCSI | 100 MBPS | NO | YES | 1GBPS | 800 MBPS | 1 HR | NO |
| 4 | | | | | | | | | | |
| 5 | | | | | | | | | | |
| 6 | | | | | | | | | | |
| 7 | | | | | | | | | | |

PERIPHERAL DEVICE SHARING ACROSS VIRTUAL MACHINES RUNNING ON DIFFERENT HOST COMPUTING SYSTEMS

RELATED APPLICATIONS

Benefit is claimed under 35 U.S.C. 119(a)-(d) to Foreign application Serial No. 5585/CHE/2014 filed in India entitled "PERIPHERAL DEVICE SHARING ACROSS VIRTUAL MACHINES RUNNING ON DIFFERENT HOST COMPUTING SYSTEMS", filed on Nov. 6, 2014, by VMware, Inc., which is herein incorporated in its entirety by reference for all purposes.

TECHNICAL FIELD

The present disclosure relates generally to cluster resource management and, more particularly, to methods, techniques, and systems for peripheral device sharing across virtual machines running on different host computing systems.

BACKGROUND

Computer virtualization is a technique that involves encapsulating a representation of a physical computing machine platform into a virtual machine (VM) that is executed under the control of virtualization software running on hardware computing platforms (also referred to herein as "host computing systems" or "servers"). A group of hardware computing platforms may be organized as a cluster to provide hardware resources, such as memory, central processing units (CPUs) and so on, for VMs. Each VM is a complete execution environment, and the server provides a user interface over the network connection so that user inputs and outputs are communicated between the user and the VM.

Further, host computing systems may be attached with one or more peripheral devices such as input devices (e.g., a keyboard, a mouse, a graphic tablet, a touch screen, an image scanner, a microphone, a webcam, and a barcode reader), output devices (e.g., a display device, a printer, and a graphical output device), storage devices (e.g., an external hard drive, a flash drive/solid-state drive, a disk drive commonly within a hard drive enclosure, a smartphone or tablet computer storage interface, a CD-ROM drive, and a DVD-ROM drive) and input and output devices (e.g., a modem and a network interface controller). Each such peripheral device requires some host computing system resources, such as processor (CPU) time, input/output (I/O) bandwidth on the various data buses, and physical memory space.

Furthermore, different generations of host computing systems can have different types of peripheral devices. Typically, when a peripheral device is attached to a first host computing system, the peripheral device is available only to VMs that run on the first host computing system and may not connect to VMs that run on other host computing systems in the datacenter.

Figure 1:
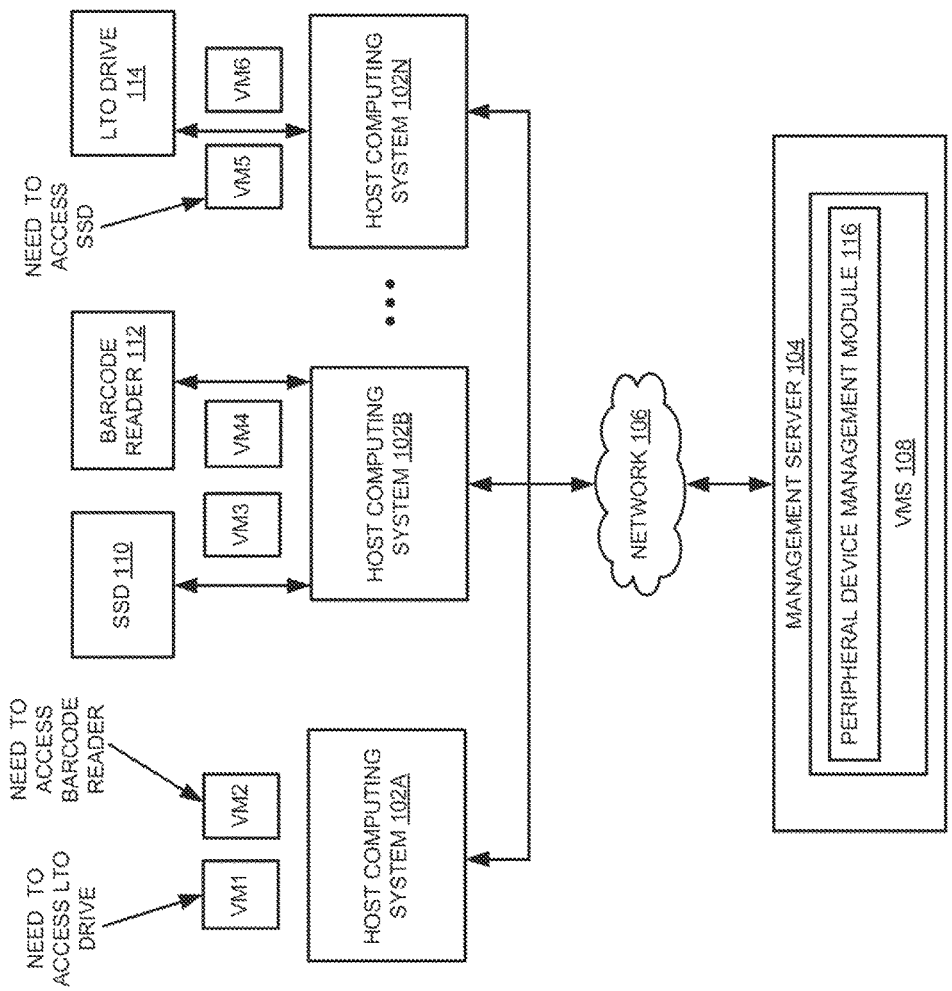
FIG. 1 is an example system view of a virtualized computing environment illustrating virtual machines (VMs) requiring access to peripheral devices that are connected to other host computing systems.

The drawings described herein are for illustration purposes only and are not intended to limit the scope of the present subject matter in any way.

DETAILED DESCRIPTION

Embodiments described herein provide enhanced computer-based and network-based methods, techniques, and systems for peripheral device sharing across virtual machines (VMs)/workloads running on different host computing systems. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The term "VM" refers to software based emulation of a physical machine (e.g., a computer) that executes programs like the physical machine. The VM includes a set of specification and configuration files and uses computing resources (e.g., central processing units (CPUs), memory and the like) of the physical machine. Further, the VM includes virtual devices that provide functionalities similar to physical hardware.

The term "peripheral device" refers to any internal or external device that connects directly to a host computing system and provides input/output (I/O) functions for VMs running on the host computing system and serves as an auxiliary computer device without computing-intensive functionality. Peripheral devices can connect with a host computing system through several input/output (I/O) interfaces, such as communications (COM), universal serial bus (USB), serial ports and so on. Example peripheral devices can include, but not limited to, a keyboard, a mouse, a graphic tablet, a touch screen, an image scanner, a microphone, a webcam, a barcode reader, a display device, a graphical output device, a printer, an external hard drive, a flash drive/solid-state drive (SSD), a disk drive commonly within a hard drive enclosure, a smartphone or a tablet computer storage interface, a CD-ROM drive, a DVD-ROM drive, a modem, and a network interface controller. Furthermore, different peripheral devices may require different bandwidths (i.e., speeds), for instance, a keyboard may require a few bytes per second (Bps), a printer may require a few kilobytes per second (KBps), and some disk drives and video interfaces may require tens of megabytes per second (MBps) or gigabytes per second (GBps).

In a virtualized datacenter, a VM running on one host computing system may need to access a peripheral device attached to a different host computing system. For example, the peripheral device can be a barcode reader having bandwidth requirement less than a threshold percentage of network bandwidth allocated to the VM or a linear tape open (LTO) drive having bandwidth requirement more than the threshold percentage of network bandwidth allocated to the VM. The network bandwidth refers to a maximum data transfer rate that is provisioned to a VM in the virtual datacenter to route incoming and outgoing data for the VM.

The example technique compares the bandwidth requirement of the peripheral device and the threshold percentage of network bandwidth allocated to the VM and enables the VM to remotely access the peripheral device over a network or locally access the peripheral device by migrating the VM to the host computing system having the peripheral device based on the comparison.

System Overview and Examples of Operation

FIG. 1 is an example system view of virtualized computing environment 100 illustrating VMs requiring access to peripheral devices that are connected to other host computing systems. Particularly, FIG. 1 illustrates host computing systems 102A-N having associated VMs running therein. Host computing systems 102A-N can be a part of one or more clusters in a virtual datacenter. Furthermore, peripheral devices are connected to host computing systems 102A-N via system bus. In the example shown in FIG. 1, peripheral devices (e.g., SSD 110 and barcode reader 112) are connected to host computing system 102B and a peripheral device (e.g., LTO drive 114) is connected to host computing system 102N.

Further as shown in FIG. 1, host computing systems 102A-N are communicative with management server 104 via network 106. In one example embodiment, network 106 is divided into a management network, a VM network and a migration network. Management server 104 includes virtual management software (VMS) 108 to communicate with host computing systems 102A-N via the management network to perform management functions. Further, the VM network enables VMs running on host computing systems 102A-N to connect to virtual and physical networks. Furthermore, the migration network refers to a network that is being isolated from VMS 108 and capable of handling live migrations.

Further, VMS 108 includes peripheral device management module 116. One skilled in the art can appreciate that peripheral device management module 116 can also be provided in a VM or virtual application that can run on any host computing system and can be provided to a user through a graphical user interface as a part of management software.

In operation, peripheral device management module 116 determines a VM requiring access to a peripheral device that is connected to other host computing system. In the example shown in FIG. 1, peripheral device management module 116 determines VM1 running on host computing system 102A as requiring access to LTO drive 114 connected to host computing system 102N, VM2 running on host computing system 102A as requiring access to barcode reader 112 connected to host computing system 102B, and VM5 running on host computing system 102N as requiring access to SSD 110 connected to host computing system 102B.

Further, peripheral device management module 116 determines the bandwidth requirement of peripheral devices (i.e., LTO drive 114, barcode reader 112, and SSD 110) by accessing a look-up table (e.g., look-up table 500 shown in FIG. 5) or by querying each of the peripheral devices. In one example, the look-up table may reside in management server 104 or can be provided in a VM or virtual application that can run on any host computing system and can be provided through a graphical user interface as a part of management software.

Figure 5:
FIG. 5 is an example lookup table showing details associated with peripheral devices and VMs in the virtualized computing environment.

FIG. 5 is an example lookup table 500 showing details associated with peripheral devices and VMs. Particularly, FIG. 5 depicts a list of peripheral devices available in a datacenter (e.g., fields 502 and 504), connectivity information between host computing systems and the peripheral devices (e.g., field 506), type of peripheral device (e.g., field 508), current usage details of each peripheral device (e.g., field 512), bandwidth requirement of each peripheral device (e.g., field 510), network bandwidth allocated to each host computing system (e.g., field 516), network bandwidth allocated to VMs (e.g., field 518), remote access flag indicating remote access availability for each peripheral device (e.g., field 514), estimated peripheral device access duration (e.g., field 520), and VM authentication required (e.g., field 522).

Referring back to FIG. 1, peripheral device management module 116 compares the bandwidth requirement of the peripheral device and a threshold percentage of network bandwidth allocated to the VM. For example, the default threshold percentage is approximately 30% or the threshold percentage can be predefined. In the example shown in FIG. 5, the bandwidth requirements of LTO drive 114, barcode reader 112, and SSD 110 are 2 GBps, 100 MBps and 3 GBps, respectively (e.g., field 510) and the network bandwidths allocated to VM1, VM2 and VM5 are 600 MBps, 800 MBps, and 1 GBps (e.g., field 518), respectively.

In one example embodiment, peripheral device management module 116 enables the VM to remotely access the peripheral device over the network, if the bandwidth requirement of the peripheral device is less than or equal to the threshold percentage of network bandwidth. In another example embodiment, peripheral device management module 116 recommends migration of the VM to the host computing system having the required peripheral device to locally access the peripheral device, if the bandwidth requirement of the peripheral device is greater than the threshold percentage of network bandwidth as explained in detail in FIG. 2.

Figure 2:
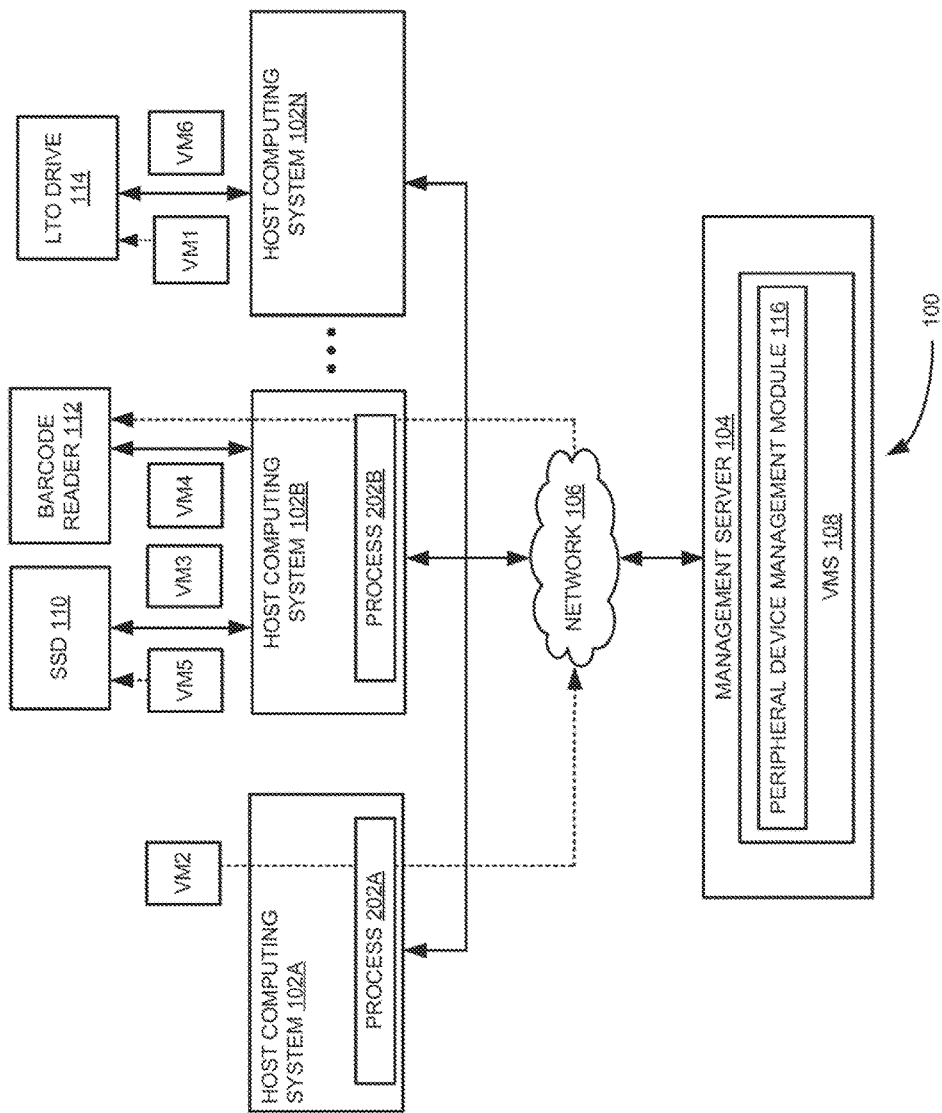
FIG. 2 is an example system view of a virtualized computing environment illustrating enabling some VMs to remotely access the peripheral devices and/or migrating some VMs to other host computing systems to locally access the peripheral devices based on a bandwidth requirement of the peripheral devices.

In one example shown in FIG. 2, VM1 running on host computing system 102A is migrated to host computing system 102N via network 106 and accesses LTO drive 114 locally as the bandwidth requirement of LTO drive 114 (e.g., 2 GBps) is greater than the threshold percentage (e.g., 30%) of network bandwidth allocated to VM1 (e.g., 600 MBps).

In another example shown in FIG. 2, VM5 running on host computing system 102N is migrated to host computing system 102B via network 106 and accesses SSD 110 locally as the bandwidth requirements of SSD 110 (e.g., 3 GBps) is greater than the threshold percentage of network bandwidth allocated to VM5 (e.g., 1 GBps).

In yet another example shown in FIG. 2, VM2 running on host computing system 102A remotely accesses barcode reader 112 over network 106 as the bandwidth requirement of barcode reader 112 (e.g., 100 MBps) is less than the threshold percentage (e.g., 30%) of network bandwidth allocated to VM2 (e.g., 800 MBps), for example in this case 240 MBps. In this example, network 106 can be a migration network that is being isolated from VMS 108 and capable of handling live migrations or any other dedicated network created for distributed peripheral device sharing. In one embodiment, peripheral device management module 116 creates process 202A in host computing system 102A and process 202B in host computing system 102B. The processes 202A and 202B running inside host computing systems 102A and 102B, respectively, coordinate to enable VM2 to remotely access barcode reader 112 over network 106. In one example embodiment, each process 202A and 202B performs encapsulation and/or decapsulation of data transferred between barcode reader 112 and VM2. When VM2 stops remote accessing of barcode reader 112, then processes 202A and 202B can be killed by peripheral device management module 116.

Example Processes

Figure 3:
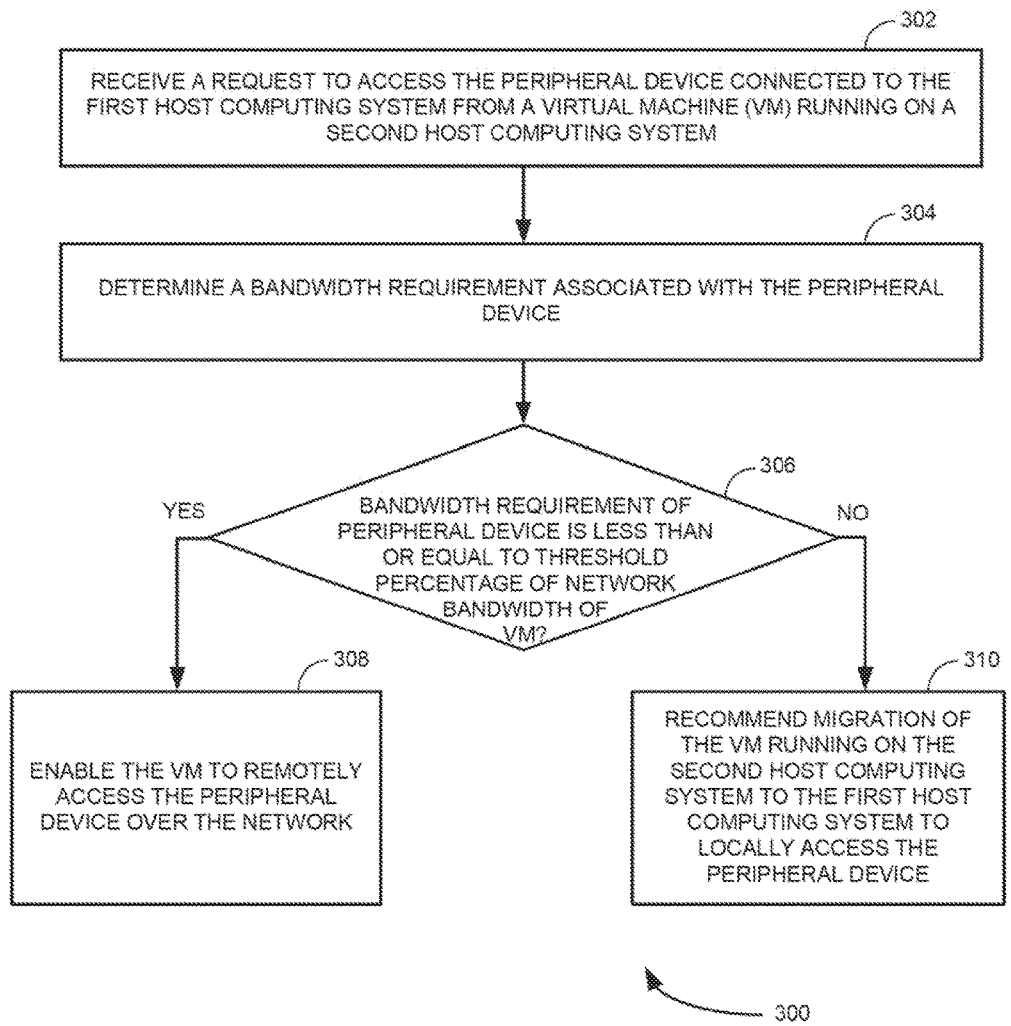
FIGS. 3 and 4 are example flow diagrams depicting example methods for sharing a peripheral device connected to a host computing system in a virtualized computing environment.
Figure 4:
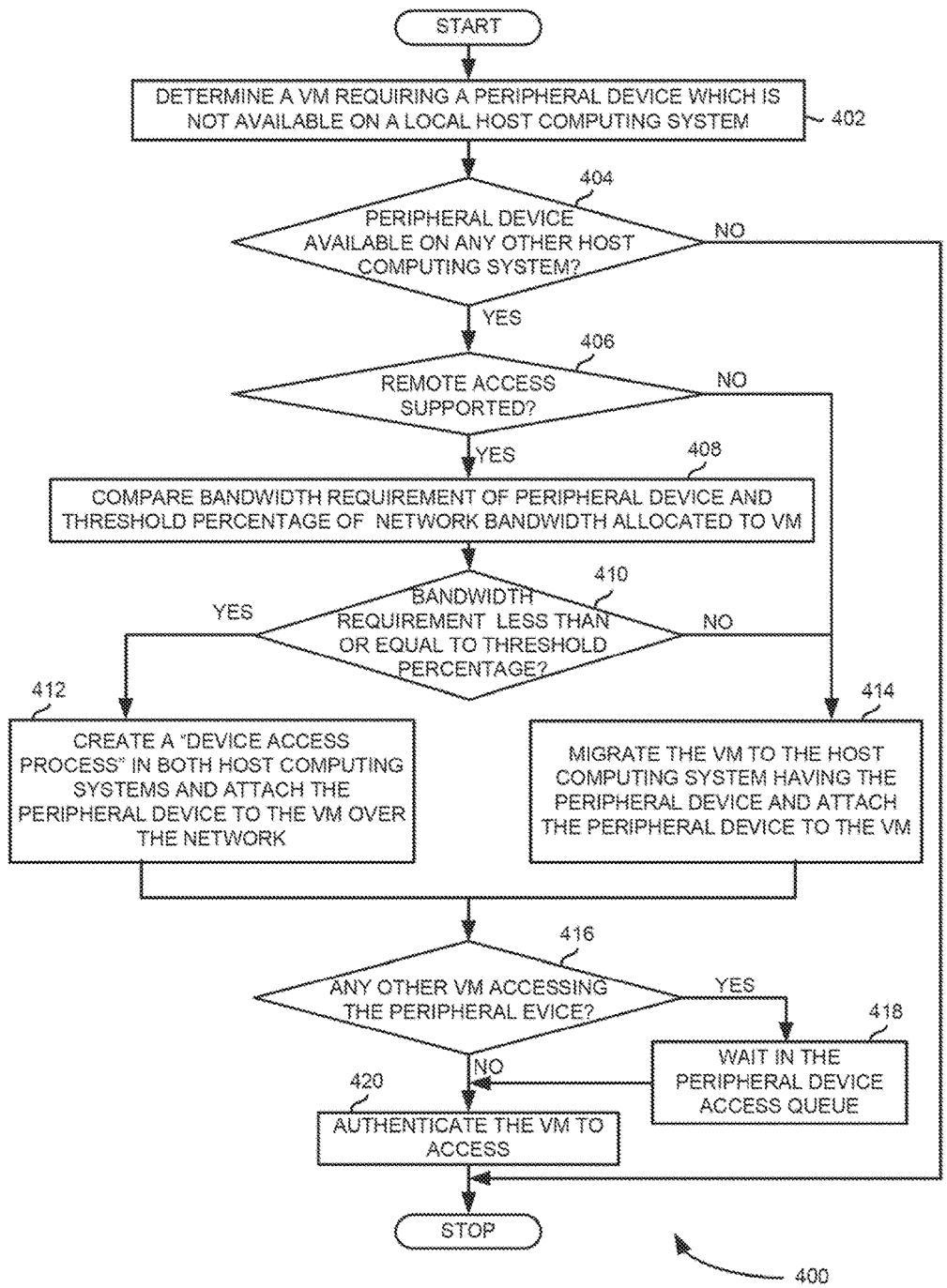

FIGS. 3 and 4 are example flow diagrams depicting example methods for sharing a peripheral device connected to a first host computing system in a virtualized computing environment. Referring to flow diagram 300 of FIG. 3, at step 302, a request to access the peripheral device connected to the first host computing system is received from a VM running on a second host computing system.

At step 304, a bandwidth requirement associated with the peripheral device is determined. In an example embodiment, the bandwidth requirement of the peripheral device is determined by accessing a look-up table or by querying the peripheral device. For example, the lookup table includes details selected from the group consisting of a list of peripheral devices available in a datacenter, connectivity information between host computing systems and the peripheral devices, current usage details of each peripheral device, bandwidth requirement of each peripheral device, network bandwidth allocated to each host computing system, network bandwidth allocated to each VM, and remote access flag for each peripheral device.

At step 306, a check is made to determine whether bandwidth requirement of the peripheral device is less than or equal to a threshold percentage of network bandwidth allocated to the VM. For example, the default threshold percentage is approximately 30% or the threshold percentage can be predefined. At step 308, the VM is enabled to remotely access the peripheral device over the network, if the bandwidth requirement of the peripheral device is less than or equal to the threshold percentage of network bandwidth. For example, the network includes a migration network that is being isolated from virtual management software and capable of handling live migrations or any other dedicated network created for distributed peripheral device sharing. In one example embodiment, a process is created in each of the first host computing system and the second host computing system to enable remote communication between the first host computing system and the second host computing system. Further, the VM is enabled to remotely access the peripheral device connected to the first host computing system over the network using the created processes. Each process performs an encapsulation and/or decapsulation of data transferred between the peripheral device and the VM. In one exemplary implementation, when the VM stops remotely accessing the peripheral device, then the process can be killed. In this example embodiment, the VM is authenticated for remotely accessing the peripheral device and the VM is enabled to remotely access the peripheral device over the network upon authentication.

At step 310, migration of the VM running on the second host computing system to the first host computing system is recommended such that the peripheral device can be accessed locally, if the bandwidth requirement of the peripheral device is greater than the threshold percentage of network bandwidth. In an example embodiment, the VM running on the second host computing system is migrated to the first host computing system in accordance with the recommendation based on computing resources available in the first host computing system and upon authentication of the VM by the first host computing system. In this example, the peripheral device can be attached to the migrated VM in the first host computing system using raw device mapping (RDM), peripheral component interconnect (PCI) pass-through, universal serial bus (USB) pass-through, attaching to integrated drive electronics (IDE) interface and the like based on the peripheral device and the VM access requirements.

FIG. 4 depicts a detailed process 400 for sharing a peripheral device in a virtualized computing environment. At step 402, a VM requiring the peripheral device that is not available on a local host computing system is determined. At step 404, a check is made to determine whether the peripheral device is available on any other host computing system using a look-up table (e.g., look-up table 500 shown in FIG. 5) residing in the management server. If the peripheral device is not available on any other host computing system, then the process 400 is terminated. If the peripheral device is available on other host computing system, then a check is made to determine whether the peripheral device supports remote access via a network using the look-up table at step 406.

If the peripheral device does not support remote access via the network, then the VM is migrated to the host computing system having the peripheral device installed/connected and the peripheral device is attached locally to the migrated VM at step 414. At step 408, a bandwidth requirement of the peripheral device is compared with a threshold percentage of network bandwidth allocated to the VM in the virtual datacenter, if the peripheral device supports remote access via the network using the look-up table. In an example embodiment, the bandwidth requirement of the peripheral device is determined by accessing the look-up table or by querying the peripheral device.

At step 410, a check is made to determine whether the bandwidth requirement of the peripheral device is less than or equal to the threshold percentage of network bandwidth allocated to the VM based on the comparison. If the bandwidth requirement of the peripheral device is less than or equal to the threshold percentage of network bandwidth allocated to the VM, at step 412, a "device access process" is created in host computing systems associated with the VM and the peripheral device and then the peripheral device is attached to the VM over the network using the device access processes.

If the bandwidth requirement of the peripheral device is greater than the threshold percentage of network bandwidth allocated to the VM, then the process goes to step 414 where the VM is migrated to the host computing system having the peripheral device installed/connected and then the peripheral device is attached locally to the migrated VM. Upon the peripheral device is attached remotely or locally to the VM (e.g., as shown in steps 412 and 414, respectively), at step 416, a check is made to determine whether any other VM is currently utilizing/accessing the peripheral device. If any other VM is currently utilizing/accessing the peripheral device, at step 418, the request from the VM is kept in an access queue associated with the peripheral device. At step 420, the VM is authenticated by the host computing system having the peripheral device and then enables the VM to access the peripheral device upon authentication.

The systems and methods as described in FIGS. 1-5 can enable a VM to access a peripheral device that is available other host computing system. The systems and methods as described in FIGS. 1-5 can dynamically manage the peripheral devices available in the virtual datacenter. The systems and methods as described in FIGS. 1-5 can automatically scan and identify peripheral devices available in the network and also maintain a look-up table including details associated with the peripheral devices. The systems and methods as described in FIGS. 1-5 can also permit per device permission/authentication for each VM.

Example Computing System Implementation

Figure 6:
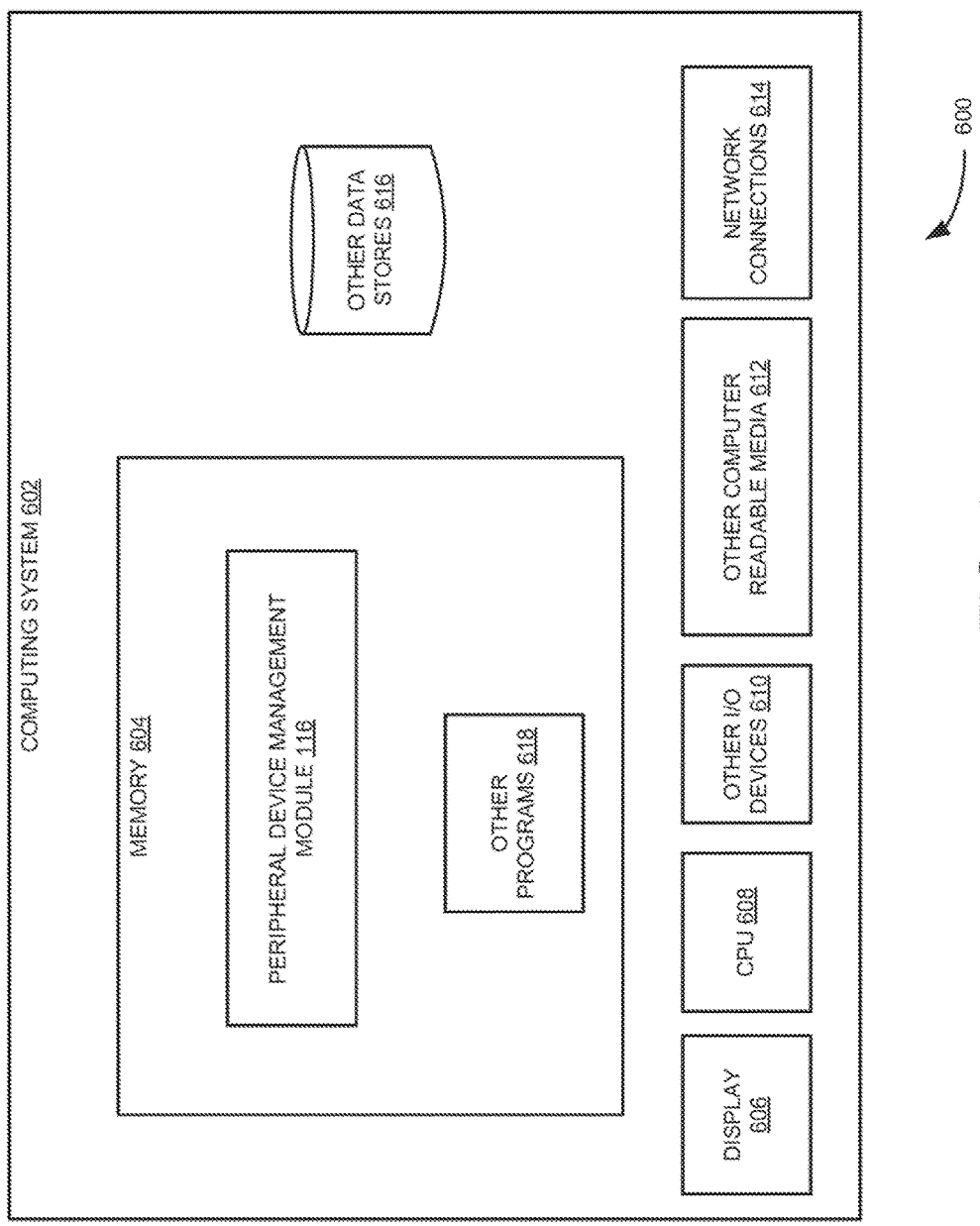
FIG. 6 is a block diagram of an example management server including a peripheral device management module.

FIG. 6 is block diagram 600 of example physical computing system 602 (e.g., management server 104 shown in FIGS. 1 and 2) including peripheral device management module 116, according to an example embodiment. In particular, FIG. 6 shows computing system 602 that may be utilized to implement peripheral device management module 116. Note that one or more general purpose virtual or physical computer systems suitably instructed may be used to implement peripheral device management module 116. In addition, computing system 602 may comprise one or more distinct computing systems/devices and may span distributed locations.

In the embodiment shown, computing system 602 may comprise computer memory ("memory") 604, display 606, one or more CPUs 608, input/output devices 610 (e.g., keyboard, mouse, etc.), other computer-readable media 612, and network connections 614. Peripheral device management module 116 is shown residing in memory 604. The components of peripheral device management module 116 may execute on one or more CPUs 608 and implement techniques described herein. Other code or programs 618 (e.g., an administrative interface, a Web server, and the like) may also reside in memory 604, and execute on one or more CPUs 608. Further, other data repositories, such as data store 616, may also reside in computing system 602. One or more of the components in FIG. 6 may not be present in any specific implementation. For example, some embodiments may not provide other computer readable media 612 and/or display 606.

Peripheral device management module 116 interacts via network with host computing systems in one or more clusters in the virtual datacenter. The network may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

In addition, programming interfaces to the data stored as part of peripheral device management module 116, such as in data store 616, can be available by standard mechanisms such as through C, C++, C#, and Java APIs; libraries for accessing files, databases, or other data repositories; through scripting languages such as XML; or through Web servers, FTP servers, or other types of servers providing access to stored data. Furthermore, in some embodiments, some or all of the components of peripheral device management module 116 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like.

Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The invention claimed is:

1. A method for sharing a peripheral device connected to a first host computing system in a virtualized computing environment, comprising:

receiving a request to access the peripheral device connected to the first host computing system from a virtual machine running on a second host computing system;

determining a bandwidth requirement associated with the peripheral device, wherein the bandwidth requirement of the peripheral device is determined by accessing a look-up table comprising a list of peripheral devices available in a datacenter, connectivity information between host computing systems and the peripheral devices, usage details of each peripheral device, a bandwidth requirement of each peripheral device, network bandwidth allocated to each host computing system, and network bandwidth allocated to each virtual machine, and remote access flag for each peripheral device;

comparing the bandwidth requirement of the peripheral device connected to the first host computing system and a threshold percentage of network bandwidth allocated to the virtual machine running on the second host computing system; and performing one of enabling the virtual machine running on the second host computing system to remotely access the peripheral device connected to the first host computing system over a network and recommending migration of the virtual machine running on the second host computing system to the first host computing system to locally access the peripheral device connected to the first host computing system based on the comparison.

2. The method of claim 1, further comprising migrating the virtual machine running on the second host computing system to the first host computing system in accordance with the recommendation based on computing resources available in the first host computing system.

3. The method of claim 1, wherein enabling the virtual machine to remotely access the peripheral device over the network, comprising:

creating a process in each of the first host computing system and the second host computing, system to enable remote communication between the first host computing system and the second host computing system; and enabling the virtual machine to remotely access the peripheral device connected to the first host computing system over the network using the created processes, wherein each process performs encapsulation and/or decapsulation of data transferred between the peripheral device and the virtual machine.

4. The method of claim 1, wherein enabling the virtual machine to remotely access the peripheral device over the network, comprises:

authenticating the virtual machine for remotely accessing the peripheral device; and enabling the virtual machine to remotely access the peripheral device over the network upon authentication.

5. The method of claim 1, wherein the network comprises one of a migration network that is being isolated from virtual management software and capable of handling live migrations and any other dedicated network created for distributed peripheral device sharing.

6. The method of claim 1, wherein the bandwidth requirement of the peripheral device is determined by querying the peripheral device.

7. The method of claim 1, wherein the network comprises one of a migration network that is being isolated from virtual management software and capable of handling live migrations and any other dedicated network created for distributed peripheral device sharing.

8. The method of claim 1, wherein performing one of enabling the virtual machine to remotely access the peripheral device over the network and recommending migration of the virtual machine to the first host computing system to locally access the peripheral device based on the comparison, comprises:

when the bandwidth requirement of the peripheral device is not greater than the threshold percentage of network bandwidth, enabling the virtual machine running on the second host computing system to remotely access the peripheral device connected to the first host computing system over the network; and when the bandwidth requirement of the peripheral device is greater than the threshold percentage of network bandwidth, recommending migration of the virtual machine running on the second host computing system to the first host computing system to locally access the peripheral device connected to the first host computing system.

9. A system comprising:

a plurality of host computing systems with each host computing system including virtual machines running therein; and a management server communicative with the plurality of host computing systems, wherein the management server includes a peripheral device management module to:

receive a request to access a peripheral device connected to a first host computing system from a virtual machine running on a second host computing system;

determine a bandwidth requirement associated with the peripheral device, wherein the bandwidth requirement of the peripheral device is determined by accessing a look-up table comprising a list of peripheral devices available in a datacenter, connectivity information between host computing systems and the peripheral devices, usage details of each peripheral device, a bandwidth requirement of each peripheral device, network bandwidth allocated to each host computing system, and network bandwidth allocated to each virtual machine, and remote access flag for each peripheral device;

compare the bandwidth requirement of the peripheral device connected to the first host computing system and a threshold percentage of network bandwidth allocated to the virtual machine running on the second host computing system; and perform one of enabling the virtual machine running on the second host computing system to remotely access the peripheral device connected to the first host computing system over a network and recommending migration of the virtual machine running on the second host computing system to the first host computing system to locally access the peripheral device connected to the first host computing system based on the comparison.

10. The system of claim 9, wherein the virtual machine running on the second host computing system can be migrated to the first host computing system in accordance with the recommendation based on computing resources available in the first host computing system.

11. The system of claim 9, wherein the peripheral device management module is further configured to:

create a process in each of the first host computing system and the second host computing system to enable remote communication between the first host computing system and the second host computing system; and enable the virtual machine to remotely access the peripheral device connected to the first host computing system over the network using the created processes, wherein each process performs encapsulation and/or decapsulation of data transferred between the peripheral device and the virtual machine.

12. The system of claim 9, wherein the peripheral device management module is further configured to:

authenticate the virtual machine for remotely accessing the peripheral device; and enable the virtual machine to remotely access the peripheral device over the network upon authentication.

13. The system of claim 9, wherein the network comprises one of a migration network that is being isolated from virtual management software and capable of handling live migrations and any other dedicated network created for distributed peripheral device sharing.

14. The system of claim 9, wherein the peripheral device management module is configured to:

enable the virtual machine running on the second host computing system to remotely access the peripheral device connected to the first host computing system over the network when the bandwidth requirement of the peripheral device is not greater than the threshold percentage of network bandwidth; and recommend migration of the virtual machine running on the second host computing system to the first host computing system to locally access the peripheral device connected to the first host computing system when the bandwidth requirement of the peripheral device is greater than the threshold percentage of network bandwidth.

15. A non-transitory computer-readable storage medium including instructions that are configured, when executed by a computing system, to perform a method for sharing a peripheral device connected to a first host computing system in a cluster, the method comprising:

receiving a request to access the peripheral device connected to the first host computing system from a virtual machine running on a second host computing system;

determining a bandwidth requirement associated with the peripheral device, wherein the bandwidth requirement of the peripheral device is determined by accessing a look-up table comprising a list of peripheral devices available in a datacenter, connectivity information between host computing systems and the peripheral devices, usage details of each peripheral device, a bandwidth requirement of each peripheral device, network bandwidth allocated to each host computing system, and network bandwidth allocated to each virtual machine, and remote access flag for each peripheral device;

comparing the bandwidth requirement of the peripheral device connected to the first host computing system and a threshold percentage of network bandwidth allocated to the virtual machine running on the second host computing system; and performing one of enabling the virtual machine running on the second host computing system to remotely access the peripheral device connected to the first host computing system over a network and recommending migration of the virtual machine running on the second host computing system to the first host computing system to locally access the peripheral device connected to the first host computing system based on the comparison.

16. The non-transitory computer-readable storage medium of claim 15, further comprising migrating the virtual machine running on the second host computing system to the first host computing system in accordance with the recommendation based on computing resources available in the first host computing system.

17. The non-transitory computer-readable storage medium of claim 15, wherein enabling the virtual machine to remotely access the peripheral device over the network, comprising:

creating a process in each of the first host computing system and the second host computing system to enable remote communication between the first host computing system and the second host computing system; and enabling the virtual machine to remotely access the peripheral device connected to the first host computing system over the network using the created processes, wherein each process performs encapsulation and/or decapsulation of data transferred between the peripheral device and the virtual machine.

18. The non-transitory computer-readable storage medium of claim 15, wherein enabling the virtual machine to remotely access the peripheral device over the network, comprises:

authenticating the virtual machine for remotely accessing the peripheral device; and enabling the virtual machine to remotely access the peripheral device over the network upon authentication.

19. The non-transitory computer-readable storage medium of claim 15, wherein the bandwidth requirement of the peripheral device is determined by one of accessing a look-up table and querying the peripheral device.

20. The non-transitory computer-readable storage medium of claim 15, wherein performing one of enabling the virtual machine to remotely access the peripheral device over the network and recommending migration of the virtual machine to the first host computing system to locally access the peripheral device based on the comparison, comprises:

when the bandwidth requirement of the peripheral device is not greater than the threshold percentage of network bandwidth, enabling the virtual machine running on the second host computing system to remotely access the peripheral device connected to the first host computing system over the network; and when the bandwidth requirement of the peripheral device is greater than the threshold percentage of network bandwidth, recommending migration of the virtual machine running on the second host computing system to the first host computing system to locally access the peripheral device connected to the first host computing system.

* * * * *